(12) United States Patent
Laufer et al.

(10) Patent No.: US 8,481,619 B2
(45) Date of Patent: Jul. 9, 2013

(54) AQUEOUS RESORCINOL-FORMALDEHYDE-LATEX DISPERSIONS, ADHESION-IMPROVED FIBRES, PROCESSES FOR PRODUCTION THEREOF AND USE THEREOF

(75) Inventors: Wilhelm Laufer, Ellerstadt (DE); Anke Blaul, Darmstadt (DE); Armin Eckert, Oberhausen-Rheinhausen (DE); Andrea Fruth, Wiesbaden (DE); Ana Maria Cano Sierra, Heidelberg (DE)

(73) Assignee: Rhein Chemie Rheinau GmbH, Mannheim, DE (US)

( * ) Notice: Subject to any disclaimer, the term of this patent is extended or adjusted under 35 U.S.C. 154(b) by 0 days.

(21) Appl. No.: 13/215,272

(22) Filed: Aug. 23, 2011

(65) Prior Publication Data

US 2012/0071595 A1   Mar. 22, 2012

(30) Foreign Application Priority Data

Aug. 30, 2010 (EP) .................... 10174548
Oct. 28, 2010 (EP) .................... 10189268
Nov. 22, 2010 (EP) .................... 10192089
Mar. 18, 2011 (EP) .................... 11158814

(51) Int. Cl.
C09J 161/12  (2006.01)
C09J 109/08  (2006.01)
B05D 5/10    (2006.01)

(52) U.S. Cl.
USPC .................... 524/98; 524/195; 427/207.1

(58) Field of Classification Search
USPC ................ 524/195, 98; 427/207.1
See application file for complete search history.

(56) References Cited

U.S. PATENT DOCUMENTS

| | | | |
|---|---|---|---|
| 2,840,589 A | 6/1958 | Smeltz | |
| 3,661,623 A | 5/1972 | Bhakuni et al. | |
| 3,821,017 A | 6/1974 | Bhakuni et al. | |
| 3,867,181 A | 2/1975 | Vizurraga | |
| 4,159,363 A | 6/1979 | Elmer et al. | |
| 4,477,619 A | 10/1984 | Lattimer et al. | |
| 5,498,747 A | 3/1996 | Pohl et al. | |
| 2002/0122938 A1* | 9/2002 | Fisher | 428/375 |
| 2008/0300347 A1 | 12/2008 | Kurz et al. | |

FOREIGN PATENT DOCUMENTS

| | | |
|---|---|---|
| DE | 1130594 | 5/1962 |
| FR | 2009338 A1 | 5/1968 |
| WO | 2010115684 A1 | 10/2010 |

OTHER PUBLICATIONS

European Search Report from co-pending Application EP11177348 dated Sep. 28, 2011, 6 pages.

* cited by examiner

*Primary Examiner* — John Uselding
(74) *Attorney, Agent, or Firm* — Michael A. Miller

(57) ABSTRACT

The present invention relates to aqueous resorcinol-formaldehyde-latex dispersions comprising at least one carbodiimide based on compounds of the formula (I)

$$R'—(—N=C=N—R—)_m—R''  \quad (I),$$

where,
m is an integer from 1 to 500,
R=$C_1$-$C_{18}$-alkylene, $C_5$-$C_{18}$-cycloalkylene-, arylene and/or $C_7$-$C_{12}$-aralkylene,
R'=R—NCO, R—NHCONHR$^1$, R—NHCONR$^1$R$^2$, R—NHCOOR$^3$ or R—NHCO—R$^5$ and
R''=—NCO, —NHCONHR$^1$, —NHCONR$^1$R$^2$, —NHCO—R$^5$ or —NHCOOR$^3$,
where R$^1$ and R$^2$ in R' are mutually independently identical or different and are a $C_1$-$C_6$-alkyl moiety, $C_6$-$C_{10}$-cycloalkyl moiety or $C_7$-$C_{12}$-aralkyl moiety, and R$^3$ is as defined for R$^1$ or is a polyester moiety or a polyamide moiety or —$(CH_2)_l$—(O—$(CH_2)_k$—O)$_g$—R$^4$, —$C_8H_4$(OH) or —$C_8H_3$(OH)—(($CH_2)_h$—$C_6H_4$(OH))$_y$,
and R$^5$=epoxide, phenol, oxime, resorcinol, polyethylene glycols and/or lactam, preferably caprolactam,
where l=from 1 to 3, k=from 1 to 3, g=from 0 to 12, h=from 1 to 2 and y=from 1 to 50,
and
R$^4$=H or $C_1$-$C_4$-alkyl.

9 Claims, No Drawings

AQUEOUS RESORCINOL-FORMALDEHYDE-LATEX DISPERSIONS, ADHESION-IMPROVED FIBRES, PROCESSES FOR PRODUCTION THEREOF AND USE THEREOF

The present invention relates to novel aqueous resorcinol-formaldehyde-latex dispersions, to adhesion-improved fibres, to processes for production thereof, and to use thereof for improving adhesion in tyres.

Carbodiimides are frequently used for the treatment of tyre cord, see U.S. Pat. No. 3,867,181 and DE-A-1770495. The said treatments are carried out in order to improve the hydrolysis resistance of PET fibres. DE-A-2326540 describes polyisocyanates which include polycarbodiimides. However, these processes are based on undesirable organic solvents and are uneconomic.

Resorcinol-formaldehyde-latex dispersions (RFL dip) have become particularly well established in the tyre sector, since they improve the adhesion of the synthetic textile (cord) to the rubber.

However, a disadvantage when polyester is used as cord material is that the adhesion-promoting properties of the RFL dip are inadequate.

Attempts have therefore been made to eliminate the said disadvantage by adding dimeric isocyanates, but these failed because of low performance levels and relatively low shelf life.

When polyester cord is used, isocyanates capped with caprolactams are added (see US A 20080300347) to the RFL dip in order to improve adhesion to the tyre/rubber. A disadvantage of these, in turn, is elimination of toxic monomeric isocyanates in later stages of the process.

EP-A 2159241 moreover discloses the use of microencapsulated dimeric diphenylmethane 4,4'-diisocyanate and diphenylmethane 2,4-diisocyanate (MDI) to improve adhesion-promoting properties. However, the substances described in that document have the disadvantages of being expensive and not commercially available and of likewise being capable of eliminating toxic monomeric diisocyanates.

It was therefore an object of the present invention to provide aqueous resorcinol-formaldehyde-latex dispersions which can be used to improve adhesion and which do not have the disadvantages of the prior art.

Surprisingly, it has now been found that novel aqueous resorcinol-formaldehyde-latex dispersions, comprising certain carbodiimides, provide excellent adhesion of the synthetic textile (cord) to the rubber. These have the advantage that they do not eliminate any toxic monomeric isocyanates during processing in the later stages of the process, and can be produced by simple production methods.

The present invention therefore provides aqueous resorcinol-formaldehyde-latex dispersions, comprising at least one carbodiimide based on compounds of the formula (I)

in which
m is an integer from 1 to 500, preferably from 1 to 20,
$R=C_1$-$C_{18}$-alkylene, $C_5$-$C_{18}$-cycloalkylene-, arylene and/or $C_7$-$C_{12}$-aralkylene,
R'=R—NCO, R—NHCONHR$^1$, R—NHCONR$^1$R$^2$, R—NHCOOR$^3$ or R—NHCO—R$^5$ and
R''=—NCO, —NHCONHR$^1$, —NHCONR$^1$R$^2$, —NHCO—R$^5$ or —NHCOOR$^3$,
where R$^1$ and R$^2$ in R' are mutually independently identical or different and are a $C_1$-$C_6$-alkyl moiety, $C_6$-$C_{10}$-cycloalkyl moiety or $C_7$-$C_{12}$-aralkyl moiety, and R$^3$ is as defined for R$^1$ or is a polyester moiety or a polyamide moiety or —(CH$_2$)$_l$—(O—(CH$_2$)$_k$—O)$_g$—R$^4$, —C$_6$H$_4$(OH) or —C$_6$H$_3$(OH)—((CH$_2$)$_h$—C$_6$H$_4$(OH))$_y$,
and R$^5$=epoxide, phenol, oxime, resorcinol, polyethylene glycols and/or lactam, preferably caprolactam,
where l=from 1 to 3, k=from 1 to 3, g=from 0 to 12, h=from 1 to 2 and y=from 1 to 50, and
R$^4$=H or $C_1$-$C_4$-alkyl.

It is equally possible to use mixtures of carbodiimides of the formula (I), inclusive of the corresponding oligomers and/or polymers.

In one particularly preferred embodiment of the invention, the carbodiimides correspond to the formulae (II to V)

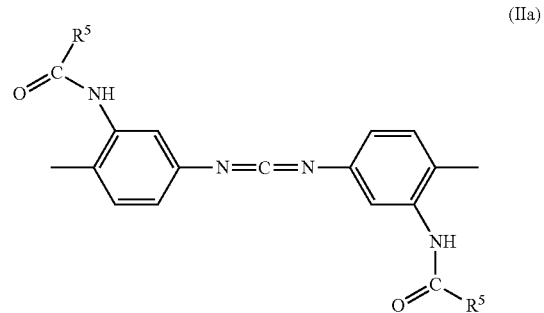

where R$^5$=epoxide, phenol, oxime, resorcinol, polyethylene glycols and/or lactam, preferably caprolactam,

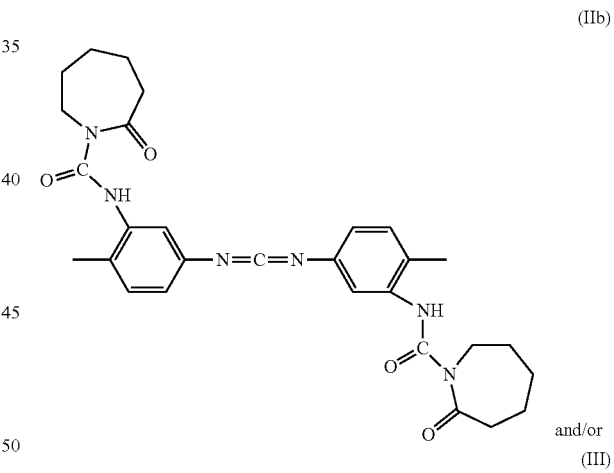

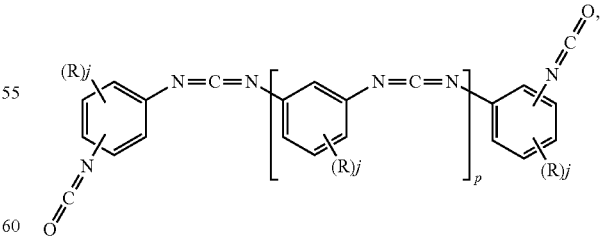

where $R=C_1$-$C_{18}$-alkylene, $C_5$-$C_{18}$-cycloalkylene-, arylene and/or $C_7$-$C_{12}$-aralkylene and
j is identical or different within the molecule and is from 1 to 5, and
p=from 0 to 500, and/or sterically hindered carbodiimides of the formula (IV)

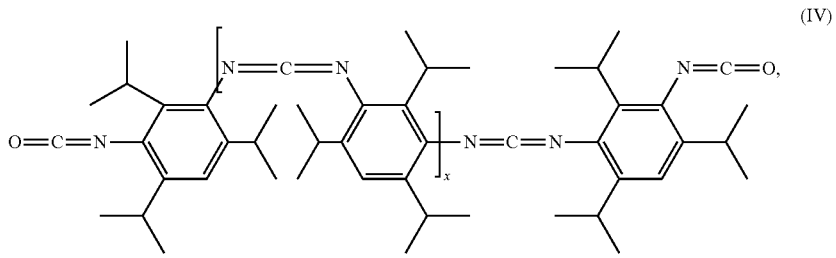

where x=from 1 to 500, preferably from 1 to 50
and/or water-soluble carbodiimides of the formula (V)

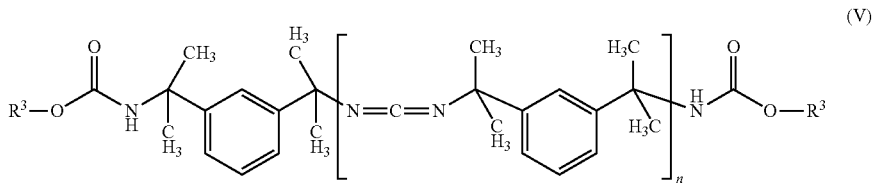

where n=from 1 to 20, preferably from 1 to 8,
and $R^3$=$C_1$-$C_6$-alkyl moiety, $C_6$-$C_{10}$-cycloalkyl moiety or $C_7$-$C_{12}$-aralkyl moiety, or a polyester moiety, or a polyamide moiety, or —$(CH_2)_l$(O—$(CH_2)_k$—O)$_g$—$R^4$,
where l=from 1-3, k=from 1-3, and g=from 0-12, and $R^4$=H or $C_1$-$C_4$-alkyl.

As a result of the production process, the carbodiimides often occur in mixtures made of monomeric, oligomeric and/or polymeric carbodiimides. The said mixtures are within the subject matter of the invention.

It is equally possible to use compounds of the formulae (I) to (IV) which have been capped, e.g. with lactams, particularly preferably caprolactam, or with phenols, with novolacs, with resorcinol, with oxime, with polyethylene glycols and/or with epoxides.

The scope of the invention includes all of the abovementioned and hereinafter-listed moiety definitions, indices, parameters and explanations, which are either general or cited in preferred ranges and are in any desired combination with one another, i.e. also in any desired combination between the respective ranges and preferred ranges.

The compounds according to formula (I) to (V) are commercially available, e.g. from Rhein Chemie Rheinau GmbH, or can be produced by the processes familiar to the person skilled in the art, as described by way of example in DE-A-11 30 594 or U.S. Pat. No. 2,840,589, or via condensation of diisocyanates with elimination of carbon dioxide at elevated temperatures, e.g. at from 40° C. to 200° C., in the presence of catalysts. Examples of catalysts which have proved successful are strong bases or phosphorus compounds. It is preferable to use phospholene oxides, phospholidines or phospholine oxides, or else the corresponding sulphides. Other catalysts that can be used are tertiary amines, metal compounds which react as bases, metal salts of carboxylic acids, and non-basic organometallic compounds.

Suitable compounds for producing the carbodiimides and/or polycarbodiimides used are any of the diisocyanates, but for the purposes of the present invention it is preferable to use carbodiimides and/or polycarbodiimides which are based on $C_1$-$C_4$-alkyl-substituted aromatic isocyanates, e.g. tolylene 2,4-diisocyanate, tolylene 2,6-diisocyanate, a mixture made of tolylene 2,4-diisocyanate and tolylene 2,6-diisocyanate, hexamethylene diisocyanate, cyclohexane 1,4-diisocyanate, xylylene diisocyanate, isophorone diisocyanate, 2,6-diisopropylphenyl isocyanate, 2,4,6-triisopropylphenyl 1,3-diisocyanate, 2,4,6-triethylphenyl 1,3-diisocyanate, 2,4,6-trimethylphenyl 1,3-diisocyanate, 2,4'-diisocyanatodiphenylmethane, 3,3,5,5'-tetraisopropyl-4,4'-diisocyanatodiphenyl methane, 3,3',5,5'-tetraethyl-4,4'-diisocyanatodiphenylmethane, tetramethylxylene diisocyanate, naphthalene 1,5-diisocyanate, diphenylmethane 4,4'-diisocyanate, diphenylmethane 2,4'-diisocyanate, diphenylmethane 2,2'-diisocyanate, diphenyldimethylmethane 4,4'-diisocyanate, phenylene 1,3-diisocyanate, phenylene 1,4-diisocyanate, dicyclohexylmethane 4,4'-diisocyanate, dicyclohexylmethane 2,4'-diisocyanate, dicyclohexylmethane 2,2'-diisocyanate, methylcyclohexane diisocyanate, tetramethyl xylylene diisocyanate, 2,6-diisopropylphenylene isocyanate and 1,3,5-triisopropylbenzene 2,4-diisocyanate or a mixture of these, or which are based on substituted aralkylene, e.g. 1,3-bis(1-methyl-1-isocyanatoethyl)benzene. It is particularly preferable that the carbodiimides and/or polycarbodiimides are based on tolylene 2,4-diisocyanate and tolylene 2,6-diisocyanate or on a mixture made of tolylene 2,4-diisocyanate and tolylene 2,6-diisocyanate.

In another embodiment of the present invention it is also possible to use a mixture of various carbodiimides.

It is particularly preferable that the particle size of the solid carbodiimides used is <50 μm.

In one embodiment of the invention, the aqueous resorcinol-formaldehyde-latex dispersions according to the invention can also comprise further additives, e.g. rheology aids (antisettling agents), e.g. Borchi®Gel ALA (OMG Borchers GmbH) or Kelzan® S obtainable from Monsanto, or else Tragacanth, obtainable from R.T. Vanderbilt, stabilizers, emulsifiers, wetting agents and/or dispersing agents, e.g. Tamol® NN 9104 from BASF AG or Aerosol® OT45 from Cytec Surface Specialities GmbH, or Dispersogen® HR from Clariant International Ltd.

For the purposes of the invention, a resorcinol-formaldehyde-latex dispersion is at least a dispersion of the individual components resorcinol and formaldehyde, and/or formaldehyde together with a precondensate made of resorcinol and formaldehyde (e.g. Rhenosin® T from Rhein Chemie Rheinau GmbH and Penacolite® 50 obtainable from Indspec Chemical Corp.) and of one or more of the latex dispersion mentioned hereinafter.

The latex dispersion used for the purposes of the invention can be any of the latices known in the prior art, e.g. XSBR latex (carboxylated styrene-butadiene copolymers), HSSBR latex (styrene-butadiene copolymers), nitrile-butadiene copolymers (NBR latex), CR latex (polychloroprene), PSBR latex (pyridine-styrene-butadiene copolymers) and/or acrylate latex (acrylate-only copolymers and styrene-acrylate copolymers) and/or styrene-butadiene-vinylpyridine copolymer latices, preference being given to styrene-butadiene-vinylpyridine copolymer latices (e.g. Pliocord VP 106, obtainable from Eliochem). These are commercially available substances obtainable by way of example from Polymer Latex GmbH or from Eliokem.

The resorcinol-formaldehyde-latex dispersion here is preferably obtained via stirring to incorporate a basic aqueous mixture made of resorcinol and formaldehyde, or preferably a basic aqueous mixture made of formaldehyde and of the precondensate of resorcinol and formaldehyde, in a basic aqueous latex mixture.

The ratio of resorcinol to formaldehyde is preferably from 1:1 to 2.5:1.

The ratio of latex, based on solids content thereof, to the condensate made of resorcinol and formaldehyde is preferably from 10:1 to 4:1, particularly preferably 6:1.

The aqueous basic solutions used are preferably aqueous sodium hydroxide and/or ammonium hydroxide solutions. Preferred pHs here are from 10 to 11.

The amounts preferably used of the carbodiimides here are from 0.5 to 10%, particularly from 5 to 8%, based on the solids content in the resorcinol-formaldehyde-latex dispersion.

The present invention further provides a process for producing the resorcinol-formaldehyde-latex dispersions according to the invention, where one at least one of the compounds of the formula (I) to (V), undiluted or in the form of an aqueous dispersion, is incorporated by stirring into the resorcinol-formaldehyde-latex dispersion.

The aqueous dispersions of the compounds of the formula (I) to (V) are preferably produced here by stirring to incorporate the compounds of the formula (I) to (V) into water, optionally with addition of further additives, e.g. rheological auxiliaries (antisettling agents), e.g. Borchi®Gel ALA (OMG Borchers GmbH) or Kelzan® S, from Monsanto, or tragacanth, obtainable from R.T. Vanderbilt, stabilizers, emulsifiers, wetting and/or dispersing agents, e.g. Tamol® NN 9104 from BASF AG or Aerosol® OT45 from Cytec Surface Specialities GmbH, Dispersogen® HR from Clariant International Ltd. in water.

The proportions of carbodiimides in the abovementioned aqueous dispersion are preferably from 1 to 80%, particularly preferably from 40 to 60%.

Commercially available apparatus can be used for the stirring/milling process, examples being a bead mill, dissolver, and/or blade stirrer.

The present invention further provides adhesive formulations comprising at least one aqueous resorcinol-formaldehyde-latex dispersion according to the invention and also an activator.

Examples of activators for the purposes of the invention are epoxides, such as glycidyl ether GE 500 from Raschig, or Bisphenol A Epoxynovolac from Editya Birla Chemical, etc.

To produce the adhesive formulations here, it is preferable that the at least one activators according to the invention are incorporated by stirring the resorcinol-formaldehyde-latex dispersion, but without exclusion of any other addition sequence.

The present invention further provides processes for improving the adhesion of reinforcement to fibres to crosslinked rubber or elastomers, where the reinforcement fibres (fibres, cord) are introduced into the adhesive formulation according to the invention and are then dried, or the reinforcement fibres (fibres, cord) are treated in one or more steps with one or more of the constituents of the adhesive formulation according to the invention.

In particular in the case of the last-mentioned treatment in a plurality of steps then using one or more constituents of the adhesive formulation according to the invention, the fibre can also be subjected to intermediate drying.

To the extent that the abovementioned process according to the invention is carried out in a plurality of steps using one or more constituents of the adhesive formulation according to the invention, examples of possible embodiments are as follows:

by way of example, the reinforcement fibre can first be introduced into at least one epoxide and optionally dried, and then introduced into the resorcinol-formaldehyde-latex dispersion according to the invention, or the reinforcement fibre is first introduced into a dispersion made of at least one epoxide and of at least one carbodiimide of the formulae (I) to (V), and is optionally dried, and then is introduced into a latex dispersion which also comprises resorcinol and formaldehyde, or formaldehyde and a resorcinol-formaldehyde precondensate.

The crosslinked rubber or elastomer here is preferably styrene-butadiene rubber (SBR rubber), butadiene rubber (BR rubber), natural rubber (NR rubber), synthetic natural rubber), polyurethane elastomers, or any mixture thereof.

In the abovementioned cases it is possible to use either preactivated (pretreated) reinforcement fibres or else non-preactivated reinforcement fibres.

The preactivated (pretreated) reinforcement fibres are by way of example polyester- or aramid-based fibres which during their production (spinning) have been treated with a size. Examples of commercially available products are KoSa 793 and KoSa 748 from KoSa. In many cases, the sizes comprise epoxides.

The non-pretreated reinforcement fibres are by way of example polyester- or aramid-based fibres. An example of commercially available products is KoSa 792.

This invention also includes a process for improving the adhesion of reinforcement fibres to crosslinked rubber or elastomers, where preactivated (pretreated) reinforcement fibres are introduced into the aqueous resorcinol-formaldehyde-latex dispersion according to the invention and are then dried.

The process according to the invention is used to guarantee an improved adhesion of reinforcement fibres to crosslinked rubber and/or elastomers in tyres, drive belts, conveyor belts and/or hoses.

The invention also includes a process for forming tyres, drive belts, conveyor belts and/or hoses comprising the steps of adding the improved adhesion of reinforcement fibres according to the invention to said tyres, drive belts, conveyor belts and/or hoses.

For the purposes of the invention, the term fibres means not only fibres but also yarns, cord, and also reinforcement textiles, based by way of example on polyester or aramid, e.g. inter alia polyethylene-therephthalate-based fibres.

The present invention also provides adhesion-improved fibres obtainable by bringing the activator-pretreated fibres into contact with at least one aqueous resorcinol-formaldehyde-latex dispersion according to the invention, or by bringing a non-pretreated fibre into contact with at least one adhesive formulation according to the invention, and subsequent drying (setting) at temperatures of from 180 to 260° C.

The present invention further provides the use of the resorcinol-formaldehyde-latex dispersion according to the invention optionally in the presence of activators to improve the bond strength between reinforcement fibres and elastomers in tyres, drive belts, conveyor belts and/or hoses.

The following examples serve to illustrate the invention, but without any resultant limited effect.

INVENTIVE EXAMPLES

Chemicals Used:
TDI carbodiimide, a carbodiimide according to formula (IIb),
Addolink® CBM, caprolactam-capped MDI (diphenyl methane 4,4-diisocyanate), obtainable from Rhein Chemie Rheinau GmbH,
Aerosol® OT 75, wetting/dispersing agent, obtainable from Cytec Surface Specialties GmbH,
Kelzan® S, antisettling agent, obtainable from Monsanto,
Penacolite® 50, a resorcinol-formaldehyde precondensate, obtainable from Indspec Chemical Corp, and also
Pliocord® VP 106, a styrene-butadiene-vinylpyridine copolymer latex having 41% solids content, obtainable from Eliokem.

Table 1 summarizes the amounts used to produce an aqueous dispersion:

TABLE 1

| Material | Ex. 1 | Ex. 2 |
| --- | --- | --- |
| TDI carbodiimide | 100 | |
| Addolink ® CBM | | 100 |
| Aerosol ® OT 75 | 2.4 | 2.4 |
| Water | 91 | 91 |
| Kelzan ® S, 3% in water | 9 | 9 |

The amounts used have been stated in parts by weight.

The method of producing the aqueous dispersion here was as follows:

Water and wetting/dispersing agent (Aerosol® OT 75) were combined and dissolved/mixed. TDI carbodiimide or Addolink® CBM was then added and the mixture was homogenized in a dissolver. The freshly produced Kelzan® S preparation was then incorporated by mixing, and the mixture was homogenized.

Table 2 gives the constitutions of adhesive formulations for treating preactivated polyester fibres:

TABLE 2

| Material | Ex. 3 (inv) | Ex. 4 (CE) | Ex. 5 (CE) |
| --- | --- | --- | --- |
| Aqueous TDI carbodiimide dispersion according to Ex. 1 | 28 | | |
| Aqueous Addolink ® CBM dispersion according to Ex. 2 | | 28 | |
| Water | 367.3 | 367.3 | 395.3 |
| Sodium hydroxide (10%) | 6 | 6 | 6 |
| Penacolite ® 50 | 42.4 | 42.4 | 42.4 |
| Formaldehyde (37%) | 20.5 | 20.5 | 20.5 |
| Pliocord VP 106 | 411 | 411 | 411 |
| Ammonia (25%) | 24.7 | 24.7 | 24.7 |

CE = comparative example,
inv = according to the invention;
the amounts used have been stated in parts by weight.

The treated fibres were predried at about 135° C. for about 60 s, and the setting process took 120 s at 230° C.

Vulcanization and adhesion testing were carried out according to ASTM D 4393. The test elastomer mixture used was Dunlop SP 5320, obtainable from Dunlop, with an activator PET yarn.

The results of adhesion testing are summarized in Table 3:

TABLE 3

| | | Examples | | |
| --- | --- | --- | --- | --- |
| Test | Unit | TDI carbodiimide (Ex. 3) | Addolink CBM (Ex. 4) | without coupling agent (Ex. 5) |
| Strap peel test (adhesion) | N/2.5 cm | 250-300 | 250-300 | 200-250 |

The experiments clearly show that the resorcinol-formaldehyde-latex dispersions according to the invention exhibit extremely good adhesion, while being markedly easier to produce and therefore more cost-effective than the prior art and moreover eliminating no toxic monomeric isocyanates during the drying process for the purpose of heat-setting. The bonding agents according to the invention therefore have marked environmental and production-related advantages over the compounds known in the prior art.

What is claimed is:

1. Aqueous resorcinol-formaldehyde-latex dispersion comprising at least one carbodiimide based on compounds of the formulas (IIa), (IIb), (III), (IV), and (V) below

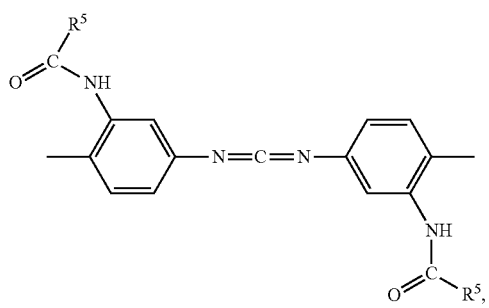

(IIa)

where $R^5$=epoxide, phenol, oxime, resorcinol, polyethylene glycols and/or lactam,

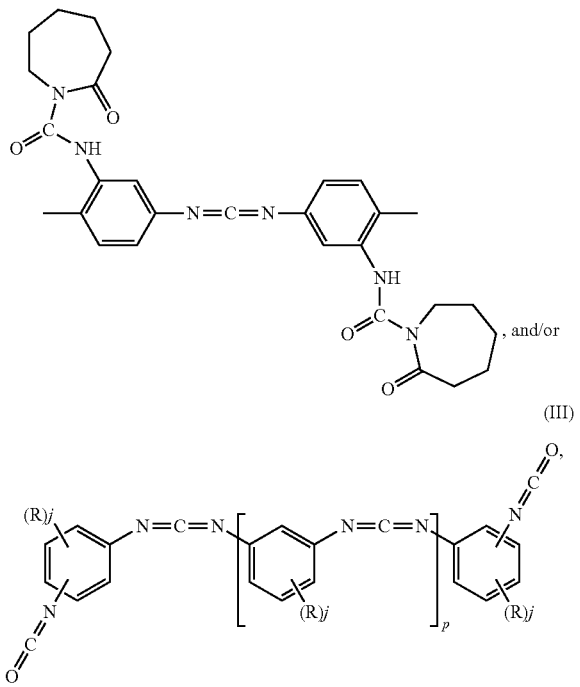

where R=$C_1$-$C_{18}$-alkylene, $C_5$-$C_{18}$-cycloalkylene-, arylene and/or $C_7$-$C_{12}$-aralkylene and j is identical or different within the molecule and is from 1 to 5, and where p=from 0 to 500,

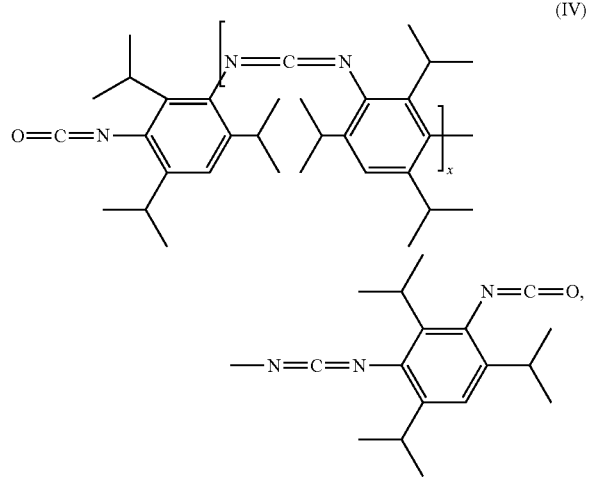

where x=from 1 to 500, and/or

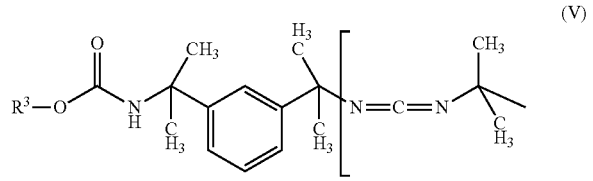

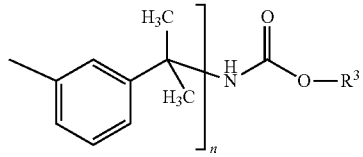

where n=from 1 to 20;
and $R^3$=a polyester moiety or polyamide moiety, or —$(CH_2)_l$—$(O$—$(CH_2)_k$—$O_g)$—$R^4$,
where l=from 1-3, k=from 1-3, g=from 0-12, and
$R^4$=H or $C_4$-$C_4$-alkyl.

2. Aqueous resorcinol-formaldehyde-latex dispersion according to claim 1, characterized in that the resorcinol-formaldehyde-latex dispersion involves a dispersion of the individual components resorcinol and formaldehyde, and/or formaldehyde together with a precondensate made of resorcinol and formaldehyde and of one or more of the latex dispersions selected from the following group consisting of carboxylated styrene-butadiene copolymers (XSBR latex), nitrile-butadiene copolymers (NBR latex), polychloroprene (CR latex), pyridine-styrene-butadiene copolymers (PSBR latex), acrylate-only copolymers, styrene-acrylate copolymers (acrylate latex), and styrene-butadiene-vinylpyridine copolymer latices.

3. Process for producing aqueous resorcinol-formaldehyde-latex dispersions according to claim 1, characterized in that at least one carbodiimide according to claim 1 is incorporated by stirring into the resorcinol-formaldehyde-latex dispersion.

4. Adhesive formulation, comprising an aqueous resorcinol-formaldehyde-latex dispersion according to claim 1 and also at least one activator.

5. Adhesive formulation according to claim 4, characterized in that the activator is at least one epoxide.

6. Process for improving the adhesion of reinforcement fibres to crosslinked rubber and/or elastomers, characterized in that introducing the fibres into an adhesive formulation according to claim 4 and drying the resultant mixture, or treating the fibres in one or more steps with one or more of the constituents of the adhesive formulation according to claim 4.

7. Process for improving the adhesion of reinforcement fibres to crosslinked rubbers or elastomers, comprising introducing preactivated fibres into an aqueous resorcinol-formaldehyde-latex dispersion according to claim 1 and drying the resultant mixture.

8. Adhesion-improved fibres, obtainable by contacting activator-pretreated fibres with at least one aqueous resorcinol-formaldehyde-latex dispersion according to claim 1, or by contacting a non-pretreated fibre with at least one adhesive formulation according to claim 4, and subsequently drying (setting) at temperatures of from 180 to 260° C.

9. Process according to claim 6, wherein the improved adhesion of reinforcement fibres to crosslinked rubber and/or elastomers is used in tyres, drive belts, conveyor belts and/or hoses.

* * * * *